United States Patent
Chamberlain (10) Patent No.: US 9,238,553 B2
(45) Date of Patent: Jan. 19, 2016

(54) POWERED CURB RAMP TUGGER LIFT (71) Applicant: GM Global Technology Operations LLC, Detroit, MI (US)

(72) Inventor: Spencer W. Chamberlain, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 139 days.

(21) Appl. No.: 13/757,332

(22) Filed: Feb. 1, 2013

(65) Prior Publication Data

US 2014/0216891 A1  Aug. 7, 2014

(51) Int. Cl.
*B65G 17/28* (2006.01)
*B65G 41/00* (2006.01)
*B66F 5/00* (2006.01)
*B66F 7/24* (2006.01)

(52) U.S. Cl.
CPC ............. *B65G 41/002* (2013.01); *B66F 5/00* (2013.01); *B66F 7/243* (2013.01)

(58) Field of Classification Search
USPC .......... 198/312, 314, 315, 318; 414/346, 347, 414/351, 471, 507
See application file for complete search history.

(56) References Cited

U.S. PATENT DOCUMENTS

| | | | | |
|---|---|---|---|---|
| 2,870,922 A * | 1/1959 | Thomson | 414/792 |
| 3,067,858 A * | 12/1962 | Loosli | 198/306 |
| 3,444,987 A * | 5/1969 | Palmer | 198/301 |
| 3,552,546 A * | 1/1971 | Rath | 198/306 |
| 3,967,716 A * | 7/1976 | Smith | 198/416 |
| 4,607,740 A * | 8/1986 | Jelbart | 198/320 |
| 4,726,459 A * | 2/1988 | Vos | 198/306 |
| 4,872,542 A * | 10/1989 | Enneking | 198/312 |
| 5,105,698 A * | 4/1992 | Dunham | 83/155 |
| 5,515,961 A * | 5/1996 | Murphy et al. | 198/302 |
| 5,795,032 A * | 8/1998 | Zimmerman | 299/33 |
| 5,833,043 A * | 11/1998 | Schmidgall et al. | 198/302 |
| 6,186,311 B1 * | 2/2001 | Conner | 198/300 |
| 6,688,450 B2 * | 2/2004 | Speers et al. | 198/312 |
| 7,077,615 B2 * | 7/2006 | Thogersen et al. | 414/346 |
| 7,191,888 B2 * | 3/2007 | Kahrger et al. | 198/303 |
| 7,584,834 B2 * | 9/2009 | Wood | 198/313 |
| 7,611,321 B1 * | 11/2009 | Cooper | 414/475 |
| 7,641,043 B2 * | 1/2010 | Vestergaard | 198/592 |
| 7,866,456 B2 * | 1/2011 | Bauman et al. | 198/311 |
| 8,123,019 B2 * | 2/2012 | Johannsen | 198/313 |
| 8,479,911 B2 * | 7/2013 | Friesen | 198/313 |
| 8,739,956 B2 * | 6/2014 | Smith | 198/306 |

* cited by examiner

*Primary Examiner* — Douglas Hess (74) *Attorney, Agent, or Firm* — BrooksGroup (57) ABSTRACT

A number of variations may include a vehicle for transporting or moving a load including a frame and may include a telescopic beam, a drive wheel and a support wheel, an arm connected to the drive wheel, and a conveyor having a first end and a second end wherein the first end is connected to the arm and the second end is connected to the support wheel. The telescopic beam may elongate and contract to reposition the position of the drive wheel in relation to the support wheel and thereby change the configuration of the vehicle and correspondingly the position of the conveyor.

27 Claims, 8 Drawing Sheets

POWERED CURB RAMP TUGGER LIFT

TECHNICAL FIELD

The field to which the disclosure generally relates to includes vehicles of the type used to move or transfer containers.

BACKGROUND

Powered industrial vehicles are used to move and transfer containers, carts, material and other loads between locations. Such vehicles are often used in unloading and transferring containers from trucks or other shipping vehicles to a factory floor or other destination.

One type of vehicle used in the unloading and transporting of containers is a powered vehicle guided by a vehicle operator that allows the operator to transport or move relatively heavy loads along an undefined path, such vehicles are often referred to as a "tugger."

In many cases, the containers may need to the pulled along narrow aisle ways or work areas, raised to various levels or heights to accommodate changes in the floor level, or elevated to a height where they can be loaded onto an elevated surface, such as a vehicle bed.

In addition, valuable time is wasted during the shipping process as many times the final leg of delivery includes loading and unloading containers onto and off of trailers, trucks and over curbs. A process that poses many challenges which can slow the delivery process

SUMMARY OF ILLUSTRATIVE VARIATIONS OF THE INVENTION

A number of variations of the invention may include a vehicle for moving a load which may include a drive wheel, a support wheel, a telescoping beam extending between the drive wheel and the support wheel, an arm connected to the support wheel and a conveyor connected to the arm and to the support wheel.

A number of variations of the invention may include a method for configuring a vehicle for a particular use including providing a frame having a telescopic member, a conveyor pivotally connected a first end thereof to the frame, a drive wheel pivotally connected to the frame, and an arm pivotally connected to the drive wheel on one end thereof and pivotally connected at an opposite end to the conveyor wherein adjusting the length of the telescopic member repositions the drive wheel and correspondingly repositions the location of the conveyor.

Other illustrative embodiments and variations of the invention will become apparent from the detailed description provided hereinafter. It should be understood that the detailed description and specific examples, while disclosing optional variations of the invention, are intended for purposes of illustration only and are not intended to limit the scope of the invention.

BRIEF DESCRIPTION OF THE DRAWINGS

Select examples of variations of the invention will become more fully understood from the detailed description and the accompanying drawings, wherein.

DETAILED DESCRIPTION OF ILLUSTRATIVE VARIATIONS OF THE INVENTION

The following description of the variations is merely illustrative in nature and is in no way intended to limit the invention, its application, or uses.

Figure 1:
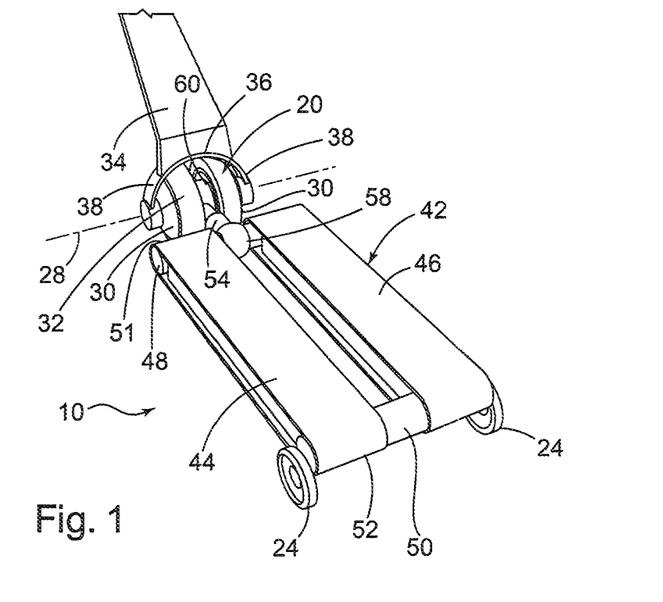
FIG. 1 is a perspective view of a vehicle shown in a tow configuration according to a number of variations of the invention.
Figure 2:
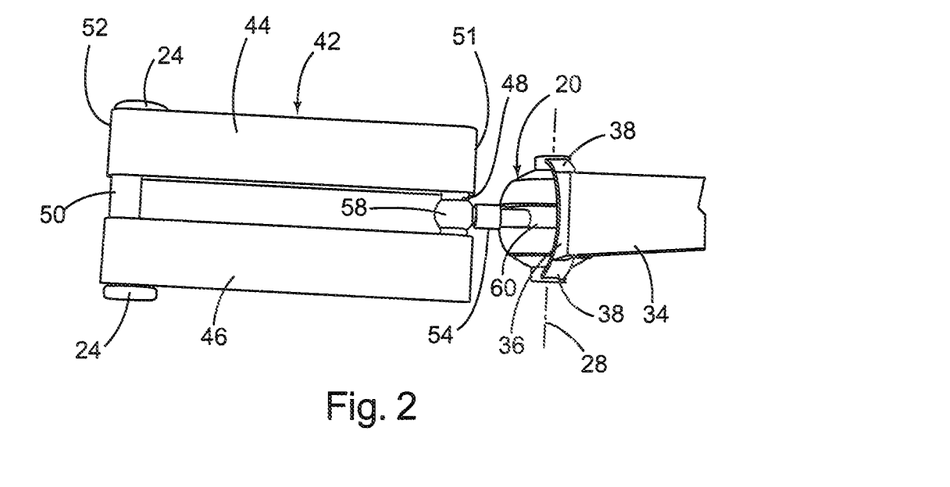
FIG. 2 is a top perspective view of the vehicle illustrated in FIG. 1.
Figure 3A:
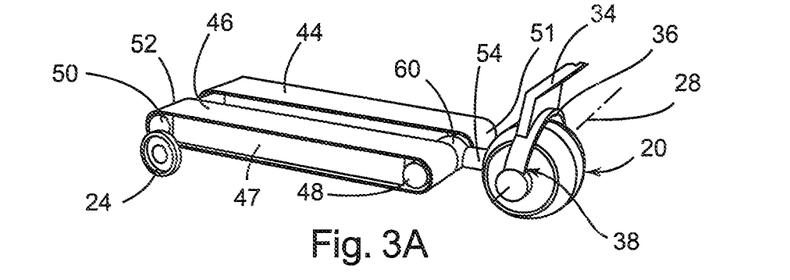
FIG. 3A is a perspective view of a vehicle shown in a tow configuration according to a number of variations of the invention.
Figure 3B:
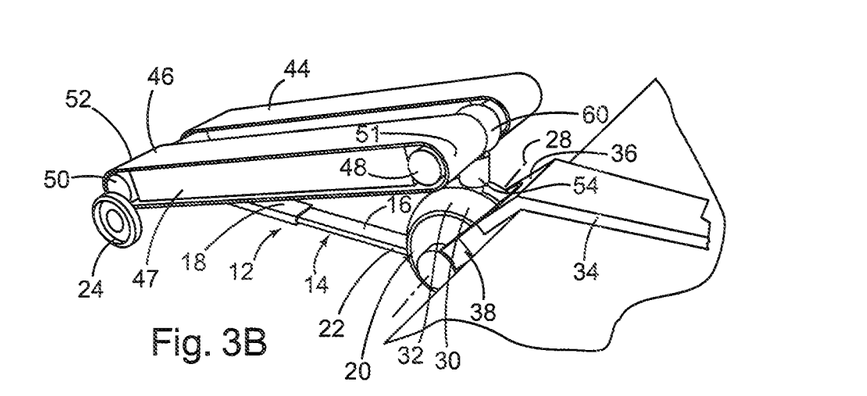
FIG. 3B is a perspective view of a vehicle shown in a curb/ramp configuration according to a number of variations of the invention.
Figure 4:
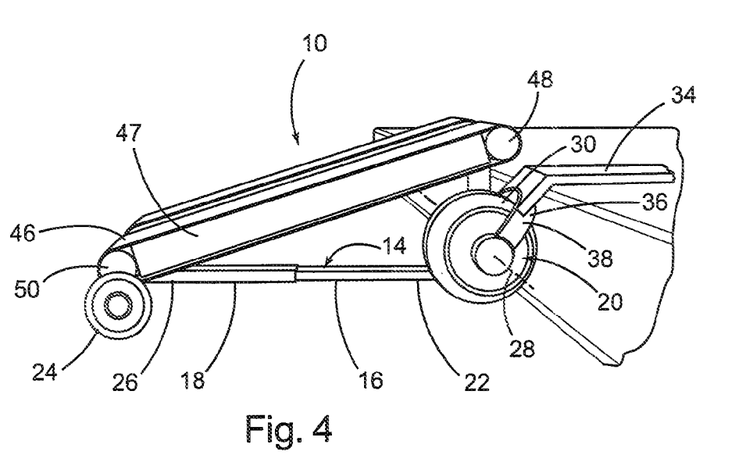
FIG. 4 is a side perspective view of the vehicle illustrated in FIG. 3B.
Figure 5:
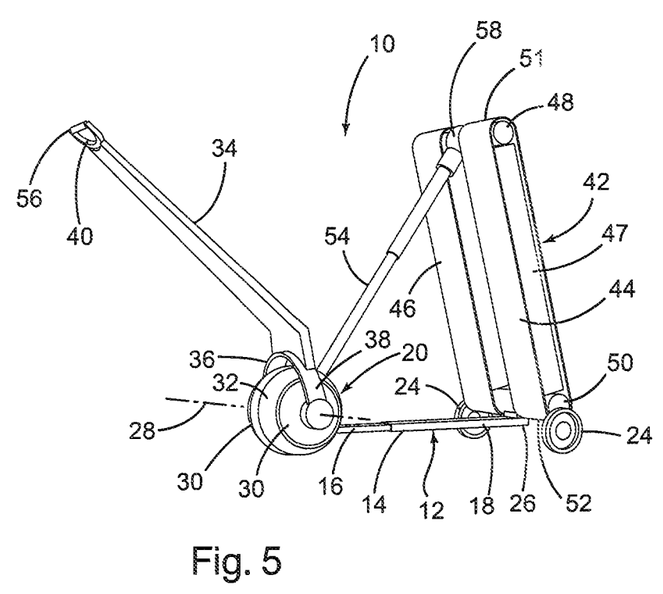
FIG. 5 is a perspective view of a vehicle shown in a lift position according to a number of variations of the invention.
Figure 6:
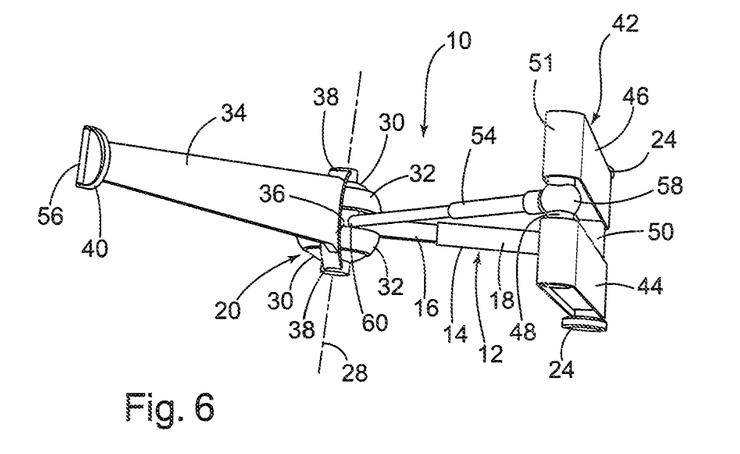
FIG. 6 is a top perspective view of the vehicle illustrated in FIG. 5.

A number of variations of the invention are illustrated in FIG. 1-6 and may include a powered vehicle, seen generally at 10. A frame, seen generally at 12, may be part of the vehicle 10. FIGS. 1-2 illustrate a variation without a beam member 14. In a number of variations, the frame 12 may include an elongated linearly telescoping beam member 14, which may have a first beam section 16 and a second beam section 18. The first and second beam sections 16, 18 may be slidably disposed in, about or over one another in a sliding, reciprocal relationship. Accordingly, as set forth more fully below, the frame 12 may be capable of elongating or contracting.

A drive wheel 20 may be pivotally connected to a first end 22 of the beam member 14. A pair of support wheels 24 may be supported on the frame 12, using smart articulating suspension, may be pivotally connected to the second or opposite end 26 of the beam member 14 (shown in FIG. 5). The drive wheel 20 may be used to power or move the vehicle 10 and may have a generally spherical shape mounted for rotation about an axis 28 located in a generally horizontal plane. The drive wheel 20 may include a pair of wheel members 30 wherein each may have an arcuate outer surface 32 in traction contact with the floor. The wheel members 30 may rotate about the axis 28. The drive wheel 20 may include an electromechanical drive unit operable to rotate each wheel member 30.

A control arm 34 may have a U-shaped yoke or fork member 36 at one end thereof may be attached through the yoke 36 to the drive wheel 20. The respective arms 38 of the yoke 36 may be attached to the axis 28 on the outside of the respective wheel members 30. The control arm 34 may include a handle portion 40 that can be grasped by the operator of the vehicle 10. A control unit 56 may have a plurality of hand operated controls such as buttons, joysticks or other knobs used to control the movement of the drive wheel 20 may be attached to the handle portion 40 of the control arm 34. In embodiment number of other variations, the control arm 34 may function as a joystick whereby movement of the control arm 34 actuates the drive wheel 20. For example, moving the control arm to the left would cause the vehicle 10 to turn left and moving the control arm 34 forward would cause the vehicle 10 to move forward. The control arm 34 may also operate or steer the vehicle using sensors and micro-switches located in or adjacent the drive wheel 20 whereby as the control arm 34 moves it actuates the sensors or micro-switches which correspondingly send a signal to the electro-mechanical drive unit to control the motion of the vehicle 10. In addition, the control arm 34 may include buttons or switches used to adjust the length of the telescopic members.

The vehicle may include a conveyor assembly, seen generally at 42 including a pair of conveyor belts 44, 46 extending between the front and rear rollers or pulleys 48, 50. A conveyor bed 47 may be positioned between the conveyor belts 44, 46 and may support a load on the conveyor belts 44, 46. The front roller or pulley 48 may be located adjacent a front end 51 of the vehicle 10 near the drive wheel 20. The rear roller or pulley 48 may be located adjacent a rear end 52 of the vehicle 10 near the support wheels 24. In embodiment number of variations, the front roller or pulley 48 may operate as an idler roller or pulley and the rear roller or pulley 50 operates as a drive roller or pulley. The conveyor assembly 42 may include an electro-mechanical drive unit coupled to the rear drive roller or pulley 50 operable to rotate the rear drive roller or pulley 50 and correspondingly the respective conveyor belts 44, 46.

The conveyor assembly 42 may be mounted on the vehicle 10 such that it pivots about the rear end 52 of the vehicle 10 adjacent the support wheels 24. The conveyor assembly 42 may be pivotally mounted about an axis or shaft connecting the support wheels 24 or it may be pivotally mounted to the frame 12. In instance number of variations, the conveyor assembly 42 may pivot or rotate about a point near the support wheels 24.

An articulating arm 54 may be pivotally attached at a first end 58 thereof to the front end 51 of the conveyor assembly 42, specifically to the front roller or pulley 48 and may pivotally attached at the second or opposite end 60 thereof to the drive wheel 20. In embodiment number of variations, the articulating arm 54 may be extendable in a telescopic relationship. It may be extended using a hydraulic or screw mechanism or any other type of mechanism used for extending or lengthening a member. In a number of variations, increasing the overall length of the articulating arm 52 may change the position of the conveyor assembly 42 and correspondingly the location of the front roller or pulley 48 thereof.

In a number of variations, the frame 12, conveyor assembly 42 and articulating arm 54 may cooperate together in a triangular relationship or configuration. In a number of variations, changing the length of one of the legs of a triangle repositions or changes the position of respective vertices of the triangle. In a number of variations, if the overall length of the frame 12 and the length of the articulating arm 54 is variable, while the overall length of the conveyor assembly 42 remains constant, adjusting or changing the overall length of either the frame 12 or articulating arm 54 moves or adjusts the position of the front roller or pulley 48 of the conveyor assembly 42.

Figure 12:
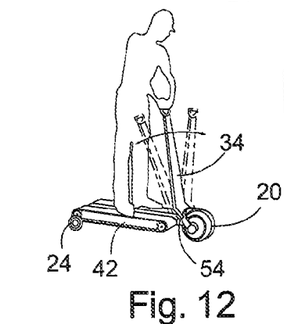
FIG. 12 is a schematic view illustrating one embodiment of the present invention in a personal transport position.
Figure 13:
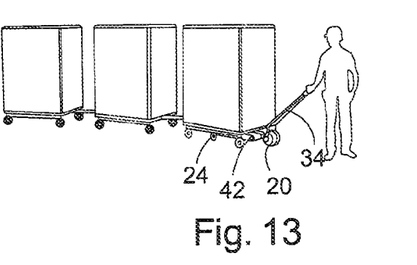
FIG. 13 is a schematic view illustrating invention product in a container transport position used for transporting a plurality of containers on roller carts according to a number of variations of the invention.

FIGS. 7-10 illustrate the vehicle 10 in separate and distinct positions or configurations. Specifically, as shown in FIGS. 7C and 12-13 a towing/transport configuration wherein the vehicle 10 connects to a skid plate of a first container, either mechanically or magnetically, and in operation tows up to several containers, typically located on trailers or carts, behind and connected to first container. In the towing/transport configuration the vehicle 10 may also suitable for use in transporting or carrying an individual. For example, as illustrated in FIG. 12, an individual may stand on the vehicle 10 and use it to commute anywhere, from several blocks up to several miles and reach a desired destination in more efficient and timely way. When used as a personal transport a user stands on the conveyor system 42 and correspondingly the conveyor belts 44, 46 and operates the vehicle 10 through use of the control arm 34 placed in a vertical position.

Figure 7A:
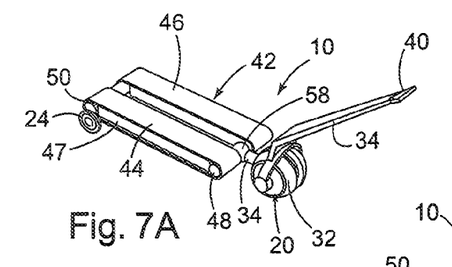
FIGS. 7A, 7B and 7C are perspective views of a vehicle showing the vehicle in various configurations according to a number of variations of the invention.
Figure 7B:
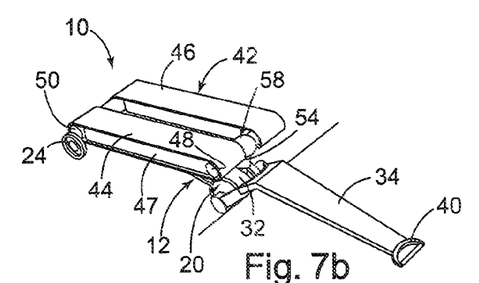
Figure 7C:
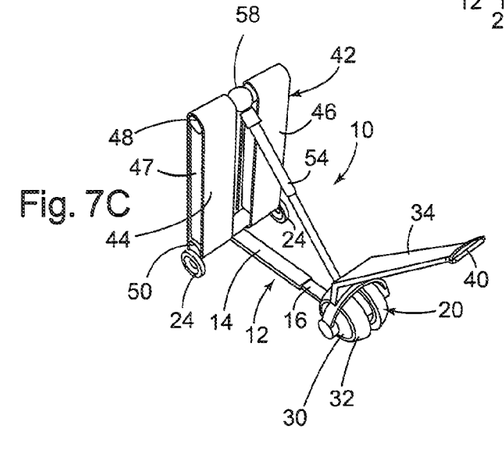
Figure 10:
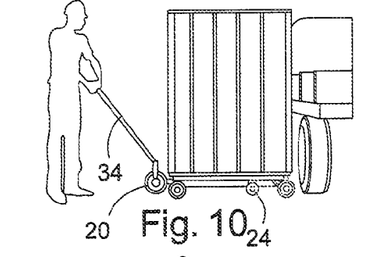
FIGS. 10-11 are schematic side views illustrating invention product placed in the lifting position and lifting a container upward for loading onto a vehicle according to a number of variations of the invention.
Figure 11:
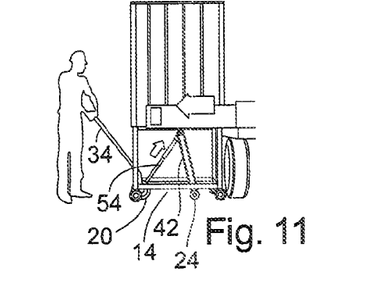

As shown in FIGS. 7C and 10-11 the vehicle 10 may be used to lift or elevate containers to a specific height. In a lifting configuration, the vehicle 10 may operate to lift containers to a specific height such as a truck bed or other elevated surface. In such a configuration, the conveyor assembly 42 may contact a skid plate on the container supported on a collapsible frame whereby raising the conveyor assembly 42 raises or lifts the container upward to a particular height or level.

Figure 8:
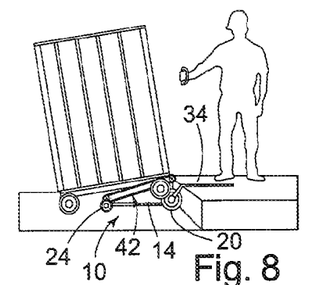
FIGS. 8-9 are a schematic side views illustrating a product placed in the curb/ramp position and transporting a container over a curb or step according to a number of variations of the invention.
Figure 9:
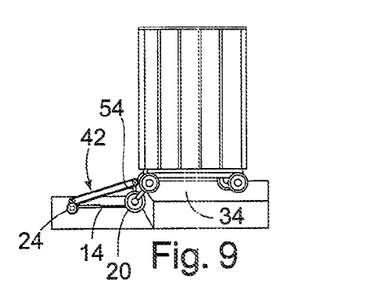

As shown in FIGS. 7B and 8-9, the vehicle 10 may be used to help transport a load up and over a ledge or curb. When placed in a curb configuration as illustrated in FIG. 7B the conveyor system 42 and corresponding conveyor belts 46, 48 may form a ramp for transporting containers from a first level to a second level. After configuring the vehicle 10 in the curb configuration, the container may be pushed forward until the skid plate of the container contacts the conveyor belts 46, 48 which then operate to carry the container up ramp formed by the conveyor system 42 up to the height of the curb or other step surface.

In the towing or personal transport configuration, the beam 14 may be placed in an extended or horizontal position wherein the respective first and second beam sections 16, 18 cooperate together to elongate or lengthen the beam 14. The articulating arm 54 may be placed in a substantially horizontal position whereby it is substantially parallel to the beam 14. In this position, the drive wheel 20 may extend outwardly in front of the front end 51 of the conveyor system 42 wherein the axis of the front idler pulley 48 and the axis of the drive wheel 24 are substantially in the same plane. In the personal transport position, see FIG. 12, the control arm 34 may extend upwards and substantially perpendicular to the conveyor system 42 whereby an operator standing on the conveyor belts 44, 46 of the conveyor system 42 can control the operation of the vehicle 10.

In the curb/ramp configuration of the vehicle 10 the length or distance between the drive wheel 20 and support wheels 24 may be reduced as the beam 14 contracts and draws the drive wheel rearwardly toward the support wheels 24. In a number of variations, the first beam section 16 and the second beam section 18 may be drawn together by linearly contracting the telescopic joint/relationship between the first beam section 16 and the second being section 18. Accordingly, contracting the beam 14 may draw the drive wheel 20 and support wheels 24 together correspondingly causing the drive wheel 20 to swing or pivot downward toward the floor or surface about the front roller or pulley 48 thereby raising the height of the front roller or pulley 48 to a level equal to the length of the articulating arm 54. Once articulating arm 54 may be substantially perpendicular to the beam 14 the drive wheel 20 may be positioned underneath the front roller or pulley 48 of the conveyor system 42 wherein the vehicle 10 may be positioned adjacent a curb or ledge. Upon properly positioning the vehicle 10, the control unit 56 may be used to actuate or engage the conveyor system 42 whereby the conveyor belts 44, 46 engage a skid plate on the bottom of the container to lift the container up to curb height transferring it to the new level. In a number of variations, the articulating arm 54 may also be telescopically elongated or contracted. Accordingly, the operator can adjust both the length of the articulating arm 54 and the beam 14 in order to position the location of the front roller or pulley 48.

Additionally, as illustrated in FIGS. 7C and 10-11, the vehicle 10 may also lift a container, typically one located on a collapsible, roller cart to a height equal to an elevated surface such as a truck bed. As illustrated in FIG. 7C, the articulated arm 54, which as set forth above may be telescopically elongated and contracted, may be elongated to push the front roller or pulley 48 upward. As shown, the greater the length of the articulating arm 54, the higher the lifting capability of the vehicle 10 with the ultimate lift height controlled by the overall length of the conveyor system 42 from the front roller or pulley 48 to the rear roller or pulley 50.

The vehicle 10 as set forth herein may have the ability to transform or change into multiple configurations for multiple uses by utilizing the linear telescopic relationship of the beam 14 and the articulating arm 54. The vehicle 10 may include three legs, a first leg formed by the beam 14, a second leg formed by the articulating arm 54, and the third leg, formed by the conveyor system 42. The beam 14 may connect the drive wheel 20 with the support wheels 24. The front end of the first beam section 16 of the beam 14 may be pivotally connected to the drive wheel 20 and the rear end of the second beam section 18 of the beam 14 may pivotally connected either to or adjacent to the support wheels 24. The articulating arm 54 may be pivotally attached at a first end 58 thereof to the drive wheel 20 and at a second end 60 of the articulated arm 54 may pivotally attached or connected is pivotally attached or connected to the front roller or pulley 48 of the conveyor system 42. Accordingly, while the front roller or pulley 48 of the conveyor system 42 may connected to the articulating arm 54 the rear roller or pulley 50 of the conveyor system 42 is pivotally connected to the frame 12 adjacent the beam 14. The rear roller or pulley 50 of the conveyor system 42 may also be pivotally connected to the beam 14.

Accordingly, the telescopically elongated or contracted legs or components of the vehicle 10 may cooperate together to adjust the configuration of the vehicle 10. Adjusting the overall length of the beam 14 or the articulating arm 54 may enables the operator to reposition the conveyor system 42. While shown herein as having a fixed or constant length, the invention contemplates a conveyor system 42 that may also telescopically elongate or contract in a linear direction.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a vehicle comprising: a drive wheel; a support wheel; a telescoping beam extending between said drive wheel and said support wheel; an arm connected to said drive wheel; and a conveyor having a first end and a second end; said first end connected to said arm and said second end connected to said support wheel.

Variation 2 may include a vehicle as set forth in Variation 1 wherein said beam is pivotally connected to said drive wheel.

Variation 3 may include a vehicle as set forth in any of Variations 1-2 wherein said drive wheel includes first and second wheel members and an electro-mechanical drive unit connected to an operable to rotate said first and second wheel members.

Variation 4 may include a vehicle as set forth in any of Variations 1-3 wherein said first and second wheel members have arcuate outer surfaces in a direction transverse an axis of rotation of said first and second wheel members.

Variation 5 may include a vehicle as set forth in any of Variations 1-4 including a control arm connected to said drive wheel.

Variation 6 may include a vehicle as set forth in any of Variations 1-5 including a control unit attached to said control arm.

Variation 7 may include a vehicle as set forth in any of Variations 1-6 wherein said conveyor includes at least one conveyor belt and a conveyor bed.

Variation 8 may include a vehicle as set forth in any of Variations 1-7 wherein said arm is pivotally connected on one end to said drive wheel and is pivotally connected on an opposite end to said conveyor system.

Variation 9 may include a vehicle as set forth in any of Variations 1-8 wherein said arm includes a telescopic member.

Variation 10 may include a vehicle comprising: a frame, said frame including a telescopic beam; a conveyor, said conveyor including first and second rollers, said conveyor system connected at one end thereof to said frame; a drive wheel, said drive wheel connected to said frame; and an arm member, said arm member connected on one end thereof to said drive wheel and on an opposite end thereof to said conveyor system.

Variation 11 may include a vehicle as set forth in any of Variations 1-10 including a control arm, said control arm connected to said drive wheel.

Variation 12 may include a vehicle as set forth in any of Variations 1-11 wherein said arm includes a telescopic member.

Variation 13 may include a vehicle as set forth in any of Variations 1-12 wherein said arm is pivotally connected on one end to said drive wheel and is pivotally connected on an opposite end to said conveyor system.

Variation 14 may include a vehicle as set forth in any of Variations 1-13 wherein said arm includes a telescopic member.

Variation 15 may include a vehicle as set forth in any of Variations 1-14 including a support wheel.

Variation 16 may include a vehicle as set forth in any of Variations 1-16 wherein said drive wheel includes at least one wheel member and an electro-mechanical drive unit operable to rotate said at least one wheel member.

Variation 17 may include a method comprising: providing a frame having a telescopic member, a conveyor pivotally connected at a first end thereof to said frame, a drive wheel pivotally connected to said frame, and an arm pivotally connected on one end to said drive wheel and pivotally connected at an opposite end to said conveyor; adjusting the length of the telescopic member to reposition the drive wheel and correspondingly reposition the conveyor.

Variation 18 may include a method as set forth in Variation 17 further comprising: providing said arm with telescopic member; adjusting the length of the arm member to reposition the conveyor.

Variation 19 may include a method as set forth in any of Variations 17-18 further comprising: providing a control arm, said control arm connected to said drive wheel; and using said control arm to control operation of said vehicle, including moving said control arm to direct movement of said vehicle such that the position of said control arm determines the direction of travel of said vehicle.

Variation 20 may include a method as set forth in any of Variations 17-19 further comprising providing a control arm; and using said control arm to adjust the length of said telescopic member.

Variation 21 may include a method of transporting or moving a load comprising using a vehicle as set forth in any of the Variations 1-16.

The above description of select examples of the invention is merely exemplary in nature and, thus, variations or variants thereof are not to be regarded as a departure from the spirit and scope of the invention.

What is claimed is:

1. A vehicle comprising:
a drive wheel;
a support wheel;
a telescoping beam extending between said drive wheel and said support wheel;
an arm connected to said drive wheel;
a conveyor having a first end and a second end; said first end connected to said arm and said second end connected to said support wheel; and wherein the arm is an articulating arm pivotally connected to the drive wheel and pivotally connected to the conveyor.

2. A vehicle as set forth in claim 1 wherein said beam is pivotally connected to said drive wheel.

3. A vehicle as set forth in claim 1 wherein said drive wheel includes first and second wheel members and an electromechanical drive unit connected to an operable to rotate said first and second wheel members.

4. A vehicle as set forth in claim 3 wherein said first and second wheel members have arcuate outer surfaces in a direction transverse an axis of rotation of said first and second wheel members.

5. A vehicle as set forth in claim 4 including a control arm connected to said drive wheel.

6. A vehicle as set forth in claim 5 including a control unit attached to said control arm.

7. A vehicle as set forth in claim 1 wherein said conveyor includes at least one conveyor belt and a conveyor bed.

8. A vehicle as set forth in claim 1 wherein said arm is pivotally connected on one end to said drive wheel and is pivotally connected on an opposite end to said conveyor system.

9. A vehicle as set forth in claim 1 wherein said arm includes a telescopic member.

10. A product as set forth in claim 1 wherein the arm includes a handle constructed and arranged to be grasped by an operator.

11. A product as set forth in claim 1 wherein the conveyor includes a forward roller or pulley and a rear roller or pulley, and a first conveyor belt extending between the forward roller or pulley and a rear roller or pulley, and further comprising an articulating arm having a first end pivotally connected to the drive wheel and the articulating arm having a second pivotally connected to forward roller or pulley of the conveyor.

12. A product as set forth in claim 11 further comprising a second conveyor belt extending between the forward roller or pulley and a rear roller or pulley.

13. The product as set forth in claim 1 wherein the telescoping beam is constructed and arranged such that when the length of the telescoping beam is adjusted the drive wheel is correspondingly adjusted.

14. A vehicle comprising:
a frame, said frame including a telescopic beam;
a conveyor, said conveyor including first and second rollers, said conveyor system connected at one end thereof to said frame;
a drive wheel, said drive wheel connected to said frame; and
an arm member, said arm member connected on one end thereof to said drive wheel and on an opposite end thereof to said conveyor system;
wherein the arm member is pivotally connected to the drive wheel and pivotally connected to the conveyor system.

15. A vehicle as set forth in claim 14 including a control arm, said control arm connected to said drive wheel.

16. A vehicle as set forth in claim 14 wherein said arm includes a telescopic member.

17. A vehicle as set forth in claim 14 wherein said arm is pivotally connected on one end to said drive wheel and is pivotally connected on an opposite end to said conveyor system.

18. A vehicle as set forth in claim 17 wherein said arm includes a telescopic member.

19. A vehicle as set forth in claim 14 including a support wheel.

20. A vehicle as set forth in claim 14 wherein said drive wheel includes at least one wheel member and an electromechanical drive unit operable to rotate said at least one wheel member.

21. A product as set forth in claim 14 wherein the arm includes a handle constructed and arranged to be grasped by an operator.

22. A product as set forth in claim 14 wherein the conveyor includes a forward roller or pulley and a rear roller or pulley, and a first conveyor belt extending between the forward roller or pulley and a rear roller or pulley, and wherein the arm member is pivotally connected to the drive wheel and pivotally connected to forward roller or pulley of the conveyor.

23. A product as set forth in claim 22 further comprising a second conveyor belt extending between the forward roller or pulley and a rear roller or pulley.

24. A method comprising:
providing a frame having a telescopic member, a conveyor pivotally connected at a first end thereof to said frame, a drive wheel pivotally connected to said frame, and an arm pivotally connected on one end to said drive wheel and pivotally connected at an opposite end to said conveyor;
adjusting the length of the telescopic member to reposition the drive wheel and correspondingly reposition the conveyor.

25. A method as set forth claim 24 further comprising:
providing said arm with telescopic member;
adjusting the length of the arm member to reposition the conveyor.

26. A method as set forth in claim 24 further comprising:
providing a control arm, said control arm connected to said drive wheel; and
using said control arm to control operation of said vehicle, including moving said control arm to direct movement of said vehicle such that the position of said control arm determines the direction of travel of said vehicle.

27. The method as set forth in claim 24 further comprising:
providing a control arm; and
using said control arm to adjust the length of said telescopic member.

* * * * *